United States Patent [19]

Brooks et al.

[11] 4,253,827

[45] Mar. 3, 1981

[54] REGISTRATION FIXTURE FOR SENSOR

[75] Inventors: Mark A. Brooks, Sterling Heights; Robert E. Fallis, Milford, both of Mich.

[73] Assignee: The Bendix Corporation, Southfield, Mich.

[21] Appl. No.: 30,581

[22] Filed: Apr. 16, 1979

[51] Int. Cl.[3] .......................... F27D 5/00; C21D 9/00
[52] U.S. Cl. ..................................... 432/253; 432/258
[58] Field of Search ....................... 432/253, 258, 261

[56] References Cited

U.S. PATENT DOCUMENTS 1,814,592  7/1931  Gelger ................................. 432/253

FOREIGN PATENT DOCUMENTS 796898  6/1958  United Kingdom ..................... 432/258

Primary Examiner—John J. Camby
Attorney, Agent, or Firm—Markell Seitzman; Gaylord P. Haas, Jr.; Russel C. Wells

[57] ABSTRACT

A pressure sensor including a pressure capsule such as a dual diaphragm quartz capacitance pressure capsule. The pressure capsule having two parallel quartz plates spaced by a dielectric ring forming a vacuum chamber therein.

A registration fixture is described which contains a plurality of flat plates, each plate having a pressure capsule receiving cavity sized to closely receive one of the quartz plates and further provides a uniform temperature radiation pattern for sealing of the pressure capsule during the controlled pressure-temperature profile.

10 Claims, 6 Drawing Figures

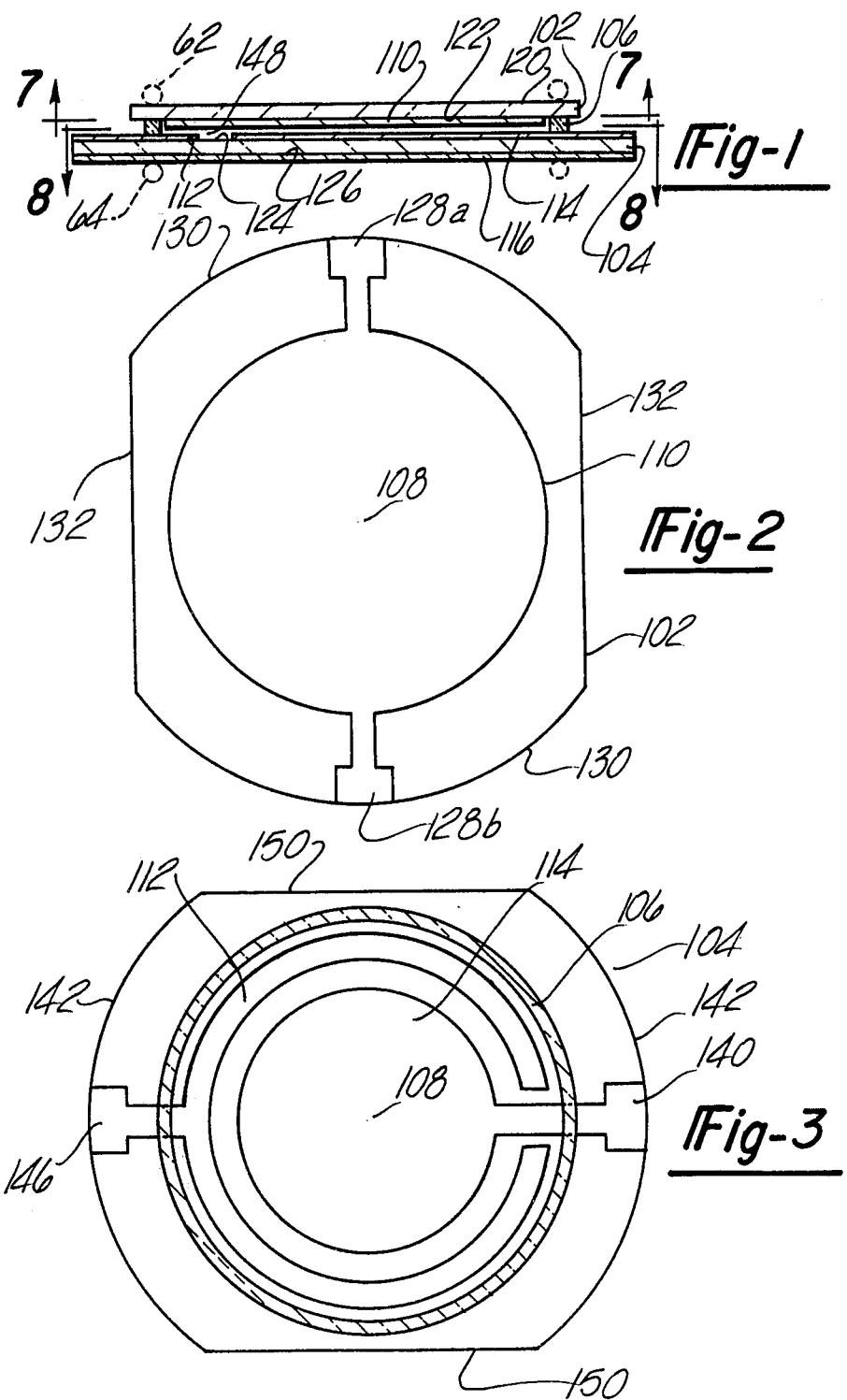

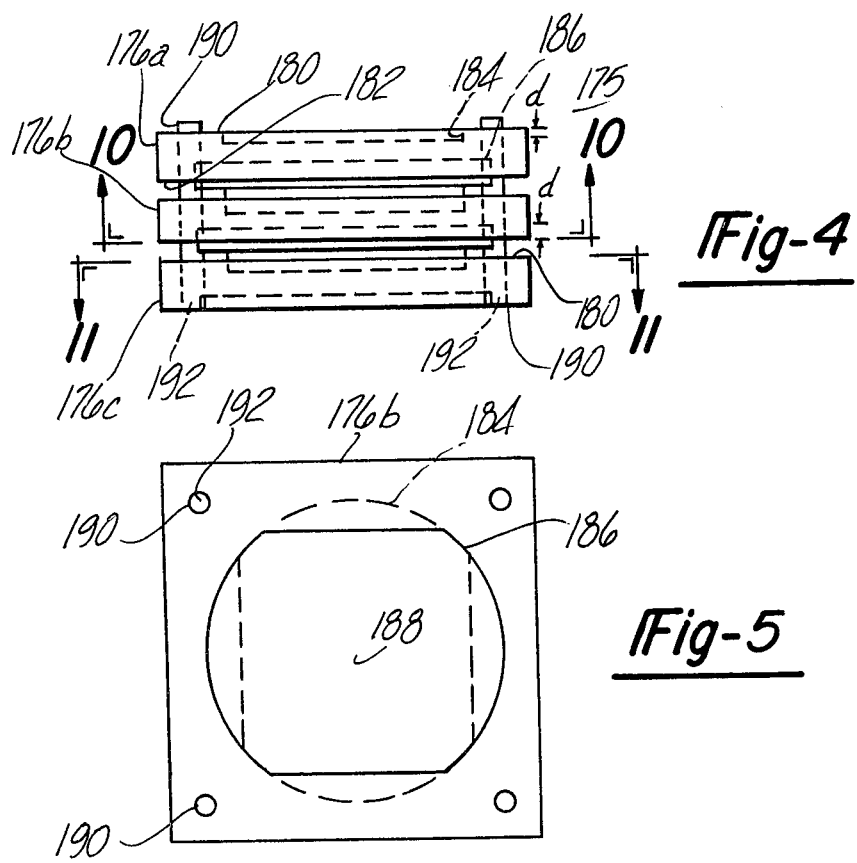
Fig-4
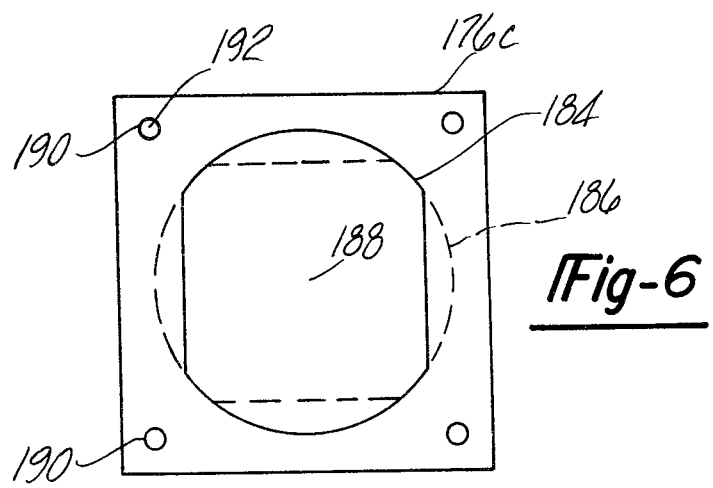
Fig-5
Fig-6

REGISTRATION FIXTURE FOR SENSOR

BACKGROUND AND SUMMARY OF THE INVENTION

The present invention relates to a registration fixture for holding, aligning, heating and registering the plates of a dual diaphragm pressure capsule during a vacuum-temperature-pressure sealing process.

The incorporation of pressure sensors into the electronic control systems of automotive vehicles poses severe operational requirements for the pressure sensor. These requirements are further heightened when the pressure sensor is used to measure the manifold pressure (MP) or the absolute manifold pressure (MAP) of the engine.

The pressure sensor must operate in a mobile and severely hostile environment which may include any of the following characteristics: varied temperature extremes, excessive shock and vibration and high levels of electromagnetic interference and corrosive gases and liquids. The pressure proximate the intake manifold is rapidly changeable and susceptable to large variations in magnitude (1-4 atmospheres) which may be caused as the result of explosive backfire or may occur during the boost phase of the operation of a supercharger or turbocharger; thus requiring a pressure sensor having a large dynamic range and high sensitivity. Irrespective of the above, if the present invention is utilized in an automobile, the requirements of the industry dictate that it must be (1) inexpensive, (2) repeatable, and (3) capable of being mass produced which implicitly requires the use of novel and rapid cost effective fabrication techniques as opposed to the slower ion-milling vacuum deposition methods such as sputter-etching techniques or brazing techniques as mentioned by Polye in U.S. Pat. No. 3,858,097 and by Dias, et al in U.S. Pat. No. 4,064,550.

The present invention is a registration fixture for holding both plates of a quartz capacitance pressure capsule in aligned relationship during the sealing of both plates together.

The fixture comprises a plurality of flat metallic plates. Each metallic plate has at least one pressure capsule receiving cavity to receive one of the quartz plates of the pressure capsule. In addition, the fixture includes means for aligning each metallic plate and hence, each quartz plate at a determinable orientation to each other. The preferred embodiment of the fixture illustrates a fixture for aligning, registering and holding in a stacked relationship, a plurality of the pressure capsules to be assembled.

Each metal plate partially envelopes its corresponding quartz plate. In this manner, the fixture provides a means for uniformly irradiating each quartz plate during the described temperature-pressure sealing process. The registration fixture described in the preferred embodiment is fabricated of steel alloy (RA 330) however, other metals and ceramics may be substituted. In addition, the optimum pressure capsule yield appears to occur when each member of the registration fixture has an oxide coating. This coating is achieved by baking or otherwise heat treating each metallic plate.

It is an object of the present invention to provide a registration fixture to hold a plurality of pressure capsules in stacked separated engagement.

This and other objects, features and advantages of the invention will be clear from the following detailed description of the drawings.

BRIEF DESCRIPTION OF THE DRAWINGS

In the drawings:

FIG. 1 is a sectional view of the pressure capsule.

FIG. 2 is a bottom view of the upper disc of the pressure capsule taken through Section 2—2 of FIG. 1.

FIG. 3 is a top view of the lower disc of the pressure capsule taken through Section 3—3 of FIG. 1.

FIG. 4 is a sectional view of a registration fixture.

FIG. 5 is a sectional view through Section 5—5 of FIG. 4.

FIG. 6 is a sectional view through Section 6—6 of FIG. 5.

DETAILED DESCRIPTION OF THE DRAWINGS

FIGS. 1, 2 and 3 illustrate the details of the pressure capsule 100. The pressure capsule 100 comprises a dual diaphragm having two coaxially oriented oblong non-conductive flexible plates or discs which are preferably fabricated from fused quartz. As will be described later, each plate or disc of the assembled capsule 100 is rotated relative to one another about their common centers 108. The pressure capsule 100 consists of an upper plate or disc 102 and a lower plate or disc 104. Each disc is maintained in spaced relationship one to the other by a dielectric material such as a frit glass 106. The upper and lower discs 102 and 104 have the same physical shape and differ by the electrodes 110, 112, 114 and a ground shield 116 imprinted thereon. In the preferred embodiment, as illustrated in FIGS. 1-3 each quartz disc is a substantially circular member having flattened sides giving it a substantially oblong appearance. The flattened sides 132 and 150 may be viewed as cut-outs and provide a reference for alignment and for registration permitting the accurate placement of the electrodes and dielectric material thereon. The flattened sides 132, 150 or cut-outs also provides easy access to a plurality of electrical contacts 128, 140 and 146. In addition, the sides 132 and 150 or cut-outs in co-operation with a registration fixture 175, discussed in FIGS. 4, 5 and 6, provide a means for aligning the plates or discs 102 and 104 at a determinable orientation relative to each other prior to and during fabrication. Other plate shapes and cut-outs may be substituted in comformity with the teachings herein. The upper quartz disc 102 has an upper surface 120 and a parallel lower surface 122. In a similar manner, the lower quartz disc 104 has an upper surface 124 and a parallel lower surface 126. A substantially circular ground electrode 122 having two oppositely extending electrical contacts 128a and b is disposed on the lower surface 102. These electrical contacts extend across the larger dimension of disc 102 to its edge 130, as shown in FIG. 2.

Reference is made to FIG. 3 which illustrates the details of the lower quartz disc 104. The lower quartz disc 104 has a circular electrode 114 disposed on its upper surface which is electrically connected to its associated electrical contact 140. The electrical contact 140 is located on the circular or peripheral edge 142 of the lower quartz disc 104. In addition, the upper surface 124 contains a substantially circular ring or c-shaped electrode 112 which partially surrounds the smaller electrode 114. The c-shaped electrode 112 is in electrical communication with an associated contact 146 located at the periphery of the lower disc 104 and is oppositely situated relative to contact 140. Further inspection of FIG. 3 reveals the c-shaped outer electrode 112 is concentricly disposed relative to the inner electrode 114 and to electrode 110. The electrode combination 110–114 shall be designated as a pressure sensing capacitor $C_p$ while the electrode combination 110–112 shall be designated as the reference capacitor $C_r$. The diameter of the ground electrode 110 should be chosen equal to or greater than the diameter of the outer electrode 112. In the preferred embodiment, the ground electrode 110 has a diameter which is ten percent larger than the diameter of the outer electrode 112 and the areas of electrodes 112 and 114 are made equal yielding capacitances $C_p$ and $C_r$ which are substantially equal. The purpose of requiring the ground electrode 110 to be equal to or slightly greater than the diameter of the outer electrode 112 is to prevent the introduction of stray capacitance into the electrical measurements providing a degree of electromagnetic isolation for the pressure capsule 100. It can be seen that the capacitive capsule 100 is effectively shielded from electromagnetic radiation by the combined shielding effects of the ground electrode 110 and ground shield 116. In addition, the ground electrode 110 and ground shield 116 may be connected together by using a wire such as ground link 118 therein insuring that the ground electrode 110 and ground shield 116 remain at the same electric voltage potential.

FIG. 3 further illustrates the relationship between the dielectric frit glass 106 and the electrodes 110, 112 and 114. In particular, the frit glass 106 which spaces the two discs apart from one another is a circular ring and has a diameter greater than either of the diameters of electrodes 110, 112. In addition, the dielectric frit glass 106 forms a pressure tight seal for the interior chamber 148 therebetween. If the pressure capsule is to function as an absolute pressure sensing apparatus the interior chamber 148 must be evacuated. The degree of vacuum within the interior chamber 148 will depend upon the low range of the desired pressure sensitivity. Under certain circumstances, it might even be desirable to back fill the interior chamber 148 to a predetermined pressure or with an inert gas to achieve a degree of temperature compensation.

Further inspection of FIGS. 1–3 reveal a unique technique, not limited to a capacitive capsule, of arranging the plurality of electrical contacts needed to communicate with the pressure capsule 100. Inasmuch as each quartz plate or disc (102, 104) has an oblong shape it is desirable to place the electrodes on the appropriate quartz disc at the dimensions of maximum distance from the center of each plate or disc. By rotating quartz plate 104, a determinable amount such a determinable amount such as 90° relative to quartz disc 102 it is apparent that the electrodes, which are located at the maximum distances from the center of each of the respective discs, will extend beyond the smaller dimensions of the substantially oblong discs. As previously mentioned, the preferred embodiment uses a substantially circular quartz disc having flattened sides, i.e. sides 132, 150, permitting the electrodes to extend beyond these flat areas for easy access.

The upper surface 120 of the upper quartz disc 102 and the ground shield 116 or the lower surface 126 of the lower disc 104 can be thought of as two pressure receiving surfaces and the areas of these pressure receiving surfaces interior to the diameter of the glass frit 106 may further be described as pressure responsive regions. The capacitive plates or discs 102, 104 will tend to deflect upon the application of the normal component of the pressure force being sensed at points interior to the support provided by the glass frit 106. A pressure capsule 100 having two pressure responsive regions yields a sensor having increased sensitivity when compared to a sensor employing a single pressure sensitive surface, that is, the use of two pressure responsive surfaces permits the use of a smaller pressure capsule 100 to achieve the same change capacitance output in comparison to a pressure sensor employing a single pressure responsive surface.

The deflections of the discs 102, 104 will cause a determinable change in the capacitance of the pressure capsule. Techniques for measuring this capacitance or change in capacitance are known in the art. One such scheme is shown by W. R. Polye in U.S. Pat. No. 3,858,097, which issued Dec. 31, 1974, while another is taught by C. Y. Lee in his commonly assigned U.S. Patent Application Ser. No. 965,453, filed Nov. 30, 1978, both of which are expressly incorporated by reference.

Reference is again made to FIGS. 4, 5 and 6 which illustrate the features of the registration fixture 175 and illustrate a method of stacking a plurality of registration fixtures one on to another to permit the mass vacuum sealing of a plurality of pressure capsules 100. Registration fixture 175 comprises a plurality of thin metal plates 176 fabricated from a steel such as the rolled alloy 330 (RA 330) having an upper surface 180 and a parallel lower surface 182. Each surface contains a pressure capsule receiving cavity 184 or 186, respectively. The dimensions of the pressure receiving cavities 184 and 186 conform to the shape of the quartz plates or discs 102 and 104 and are sized to closely receive each disc 102 and 104. In addition, the depth "d" of each pressure capsule receiving cavity (184, 186) is chosen so that when the quartz disc having electrodes or frit imprinted thereon is placed therein, a portion of the quartz discs will protrude therefrom. The pressure capsule receiving cavities 184 and 186 on the upper and lower surface 180 and 182 of each plate 176 are oriented relative to one another to permit the alignment of the flat ends 132, 150 (i.e., cut-outs) to the electrical contacts 120, 140 and 146. In the preferred embodiment, the pressure capsule receiving cavities 180 and 182 are rotated 90° relative to each other to permit the desired perpendicular placement of the plurality of electrical contacts.

The loading or the stacking of each pressure capsule 100 within the registration fixture is performed in the following manner. A cured and preglazed disc such as disc 104 is placed into the upper pressure capsule receiving cavity 182 of one of the registration fixture plates such as plate 176a. The second cured disc 102 is placed within the lower receiving pressure capsule receiving cavity 186 of a second plate such as plate 176b. The plates 176a and 176b having the quartz plates 102, 104 respectively with the electrode surfaces protruding therefrom and are laid one onto the other to achieve the 90° mounting relationship of the electrodes 110, 112, and 114. By repeating the above stacking procedure a plurality of pressure capsules 100 can be assembled in stacked relationship within the registration fixture 175.

To achieve the alignment of each metal plate 176 and therefore the alignment of each disc 102 to the opposing disc 104 every metal plate 176 is fabricated with an set of alignment holes 190 adapted to receive an alignment pin 192. The alignment pin 192 is fabricated from the same metal used for the metal plate 176. To enhance the uniform heating of the pressure capsule 100 by the registration fixture 175, it is preferable to heat treat the registration fixture 175 (i.e., each plate 176) to develop an oxide layer throughout.

Many changes and modifications in the above described embodiment of the invention can of course be carried out without parting from the scope thereof. Accordingly, that scope is intended to be limited only by the scope of the appended claims.

Having thus described the invention, what is claimed is:

1. A fixture to hold a pressure capsule having a first and a second plate and to enhance the uniform heating of said first and said second plate, the fixture comprising:
   means for receiving the first plate;
   means for receiving the second plate;
   means for rotationally aligning said first plate to said second plate;
   oxide means affixed to and coating said means for receiving for uniformly radiating, during heating, said first and said second plate.

2. A fixture for fabricating a pressure capsule, the pressure capsule having opposingly spaced first and a second plate with each plate having first and second plate surfaces, the fixture comprising:
   a first holding member having:
   means for receiving at least one of said surfaces of said first plate and for aligning said first plate relative to a reference feature on said first holding member;
   a second holding member spaced by said pressure capsule from said first holding member and having:
   means for receiving at least one of said surfaces of said second plate and for aligning said second plate relative to a reference feature on said second holding member;
   means for rotationally aligning said first holding member to said second holding member and for registering said first plate in contacting engagement with said second plate; and
   oxide means affixed to and coating said first and said second holding member for uniformly radiating, during heating, said first and said second plate.

3. The fixture as recited in claim 2 wherein said holding member and said second holding member is alloyed steel such as RA 330.

4. The fixture as recited in claim 3 wherein said oxide means for the uniformly heating includes a layer of oxide caused by heating said holding members to a determinable temperature.

5. A fixture to hold at least one pressure capsules, each pressure capsule having a first and a second plate, during the joining of each first and second plate together, comprising:
   a plurality of holding member means, inter spacing each of said pressure capsules, for holding said at least one pressure capsule in separated, stacked and rotationally aligned engagement.

6. A fixture to hold at least one pressure capsule, each pressure capsule having a first and a second plate, comprising:
   a plurality of holding member means, interspacing each of said pressure capsules, for holding said at least one pressure capsule in separated, stacked and aligned engagement and where each holding member includes:
   a holding member having:
   an upper and a parallel lower surface thereon, and having first receiving means, located on said upper surface for closely receiving said first plate, said first receiving means including a recessed portion having substantially the same surface dimensions as said first plate of a particular one of said at least one pressure capsule;
   second receiving means located on said lower surface for closely receiving said second plate, said second receiving means including a recessed portion having substantially the same surface dimensions as said second plate of another one of said at least one pressure capsule;
   alignment means connecting each holding member means for alighning each holding member means one to the other; and
   registration means for registering each plate to its associated second plate.

7. The fixture as recited in claim 6 wherein said alignment means comprises: a plurality of alignment pins slideably received in a like plurality of openings located in each of said holding member and where each of said plurality of openings in each of said holding members registered relative to one another.

8. The fixture as recited in claim 7 wherein said registration means comprises means for orienting each said first receiving means to said second receiving means so that when said first plate of said particular pressure capsule is located within said first receiving means and when a second plate of said particular pressure capsule is located within said second receiving means of another holding member said plates are mounted in contacting engagement and aligned one to the other at a determinable orientation.

9. The fixture as recited in claim 8 wherein said holding member is an alloyed steel (RA 330).

10. The fixture as recited in claim 9 wherein said steel holding member includes said holding member having a layer of oxide caused by heating said holding member to a determinable temperature.

* * * * *